(12) United States Patent
Ishida et al.

(10) Patent No.: US 7,539,111 B2
(45) Date of Patent: May 26, 2009

(54) OPTICAL DISC, OPTICAL DISC RECORDING DEVICE, OPTICAL DISC RECORDING METHOD

(75) Inventors: Takashi Ishida, Yawata (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/519,535

(22) PCT Filed: Jun. 30, 2003

(86) PCT No.: PCT/JP03/08262

§ 371 (c)(1),
(2), (4) Date: Aug. 4, 2005

(87) PCT Pub. No.: WO2004/003897

PCT Pub. Date: Jan. 8, 2004

(65) Prior Publication Data

US 2006/0013118 A1    Jan. 19, 2006

(30) Foreign Application Priority Data

Jul. 1, 2002  (JP) .............. 2002-192192
Oct. 24, 2002 (JP) .............. 2002-310094

(51) Int. Cl.
*G11B 20/12* (2006.01)
*G11B 7/00* (2006.01)

(52) U.S. Cl. .............. 369/59.25; 369/47.15; 369/47.5; 369/53.31

(58) Field of Classification Search .............. 369/275.3, 369/59.25, 53.22, 47.51
See application file for complete search history.

(56) References Cited

U.S. PATENT DOCUMENTS

| 5,805,546 | A  | * | 9/1998  | Ando ............ 369/47.51 |
| 6,256,282 | B1 | * | 7/2001  | Yamagami et al. ...... 369/111 |
| 6,552,982 | B1 |   | 4/2003  | Fukushima et al. |
| 6,614,735 | B2 |   | 9/2003  | Shoji et al. |
| 6,839,385 | B1 | * | 1/2005  | Ueda ............ 375/240.2 |

(Continued)

FOREIGN PATENT DOCUMENTS

CN    1346488    4/2002

(Continued)

OTHER PUBLICATIONS

European Search Report mailed Apr. 3, 2008 for European Application No. 03738569.

*Primary Examiner*—Wayne R Young
*Assistant Examiner*—Van T Pham
(74) *Attorney, Agent, or Firm*—Wenderoth, Lind & Ponack, L.L.P.

(57) ABSTRACT

Drive information is updated to always include the recording/playback conditions determined from the most recent learning process on a data recording medium. The data recording medium has a data recording area for recording data, and a drive information area for recording drive information. The drive information includes a plurality of drive-specific information records. Each of the plural drive-specific information records defines the operating conditions of the data recording and playback apparatus when a data recording and playback apparatus that can load and access the data recording medium reads or writes data. The plural drive-specific information records are arranged chronologically according to when the information was recorded to the data recording medium.

18 Claims, 18 Drawing Sheets

U.S. PATENT DOCUMENTS

| | | | |
|---|---|---|---|
| 2001/0014070 A1* | 8/2001 | Ando et al. | 369/59.25 |
| 2001/0036136 A1 | 11/2001 | Fukushima et al. | |
| 2002/0083393 A1* | 6/2002 | Hall et al. | 714/785 |
| 2003/0090971 A1* | 5/2003 | Gushima et al. | 369/47.3 |
| 2004/0015708 A1* | 1/2004 | Obayashi et al. | 713/189 |

FOREIGN PATENT DOCUMENTS

| | | |
|---|---|---|
| EP | 0 984 441 | 3/2000 |
| EP | 1035539 | 9/2000 |
| JP | 58-73022 | 5/1983 |
| JP | 2000-322818 | * 11/2000 |
| JP | 2001-331945 | 11/2001 |
| JP | 2001-338422 | 12/2001 |
| WO | 00/54261 | 9/2000 |

* cited by examiner

Fig.6

| CLUSTER #1 | SECTOR #1 | D(1) |
| | SECTOR #2 | |
| | SECTOR #3 | |
| | SECTOR #4 | |
| | SECTOR #5 | |
| | ⋮ | |
| | SECTOR #32 | |
| CLUSTER #2 | SECTOR #1 | D(2) |
| | SECTOR #2 | D(1) |
| | SECTOR #3 | |
| | SECTOR #4 | |
| | SECTOR #5 | |
| | ⋮ | |
| | SECTOR #32 | |
| CLUSTER #3 | SECTOR #1 | |
| | SECTOR #2 | |
| | SECTOR #3 | |
| | SECTOR #4 | |
| | SECTOR #5 | |
| | ⋮ | |
| | SECTOR #32 | |
| CLUSTER #4 | SECTOR #1 | |
| | SECTOR #2 | |
| | SECTOR #3 | |
| | SECTOR #4 | |
| | SECTOR #5 | |
| | ⋮ | |
| | SECTOR #32 | |
| CLUSTER #5 | SECTOR #1 | |
| | SECTOR #2 | |
| | SECTOR #3 | |
| | SECTOR #4 | |
| | SECTOR #5 | |
| | ⋮ | |
| | SECTOR #32 | |

| CLUSTER #1 | SECTOR #1 | D(1) |
| | SECTOR #2 | |
| | SECTOR #3 | |
| | SECTOR #4 | |
| | SECTOR #5 | |
| | ⋮ | |
| | SECTOR #32 | |
| CLUSTER #2 | SECTOR #1 | D(2) |
| | SECTOR #2 | D(1) |
| | SECTOR #3 | |
| | SECTOR #4 | |
| | SECTOR #5 | |
| | ⋮ | |
| | SECTOR #32 | |
| CLUSTER #3 | SECTOR #1 | D(3) |
| | SECTOR #2 | D(2) |
| | SECTOR #3 | D(1) |
| | SECTOR #4 | |
| | SECTOR #5 | |
| | ⋮ | |
| | SECTOR #32 | |
| CLUSTER #4 | SECTOR #1 | |
| | SECTOR #2 | |
| | SECTOR #3 | |
| | SECTOR #4 | |
| | SECTOR #5 | |
| | ⋮ | |
| | SECTOR #32 | |
| CLUSTER #5 | SECTOR #1 | |
| | SECTOR #2 | |
| | SECTOR #3 | |
| | SECTOR #4 | |
| | SECTOR #5 | |
| | ⋮ | |
| | SECTOR #32 | |

| CLUSTER #1 | SECTOR #1 | D(1) |
| --- | --- | --- |
| | SECTOR #2 | |
| | SECTOR #3 | |
| | SECTOR #4 | |
| | SECTOR #5 | |
| | ⋮ | |
| | SECTOR #32 | |
| CLUSTER #2 | SECTOR #1 | D(2) |
| | SECTOR #2 | D(1) |
| | SECTOR #3 | |
| | SECTOR #4 | |
| | SECTOR #5 | |
| | ⋮ | |
| | SECTOR #32 | |
| CLUSTER #3 | SECTOR #1 | D(3) |
| | SECTOR #2 | D(2) |
| | SECTOR #3 | D(1) |
| | SECTOR #4 | |
| | SECTOR #5 | |
| | ⋮ | |
| | SECTOR #32 | |
| CLUSTER #4 | SECTOR #1 | D(4) |
| | SECTOR #2 | D(3) |
| | SECTOR #3 | D(2) |
| | SECTOR #4 | D(1) |
| | SECTOR #5 | |
| | ⋮ | |
| | SECTOR #32 | |
| CLUSTER #5 | SECTOR #1 | |
| | SECTOR #2 | |
| | SECTOR #3 | |
| | SECTOR #4 | |
| | SECTOR #5 | |
| | ⋮ | |
| | SECTOR #32 | |

| CLUSTER #1 | SECTOR #1 | D(1) |
| | SECTOR #2 | |
| | SECTOR #3 | |
| | SECTOR #4 | |
| | SECTOR #5 | |
| | ⋮ | |
| | SECTOR #32 | |
| CLUSTER #2 | SECTOR #1 | D(2) |
| | SECTOR #2 | D(1) |
| | SECTOR #3 | |
| | SECTOR #4 | |
| | SECTOR #5 | |
| | ⋮ | |
| | SECTOR #32 | |
| ⋮ | ⋮ | |
| CLUSTER #k | SECTOR #1 | D(k)=D(n+31) |
| | SECTOR #2 | D(n+30) |
| | SECTOR #3 | D(n+29) |
| | SECTOR #4 | D(n+28) |
| | SECTOR #5 | D(n+27) |
| | ⋮ | |
| | SECTOR #32 | D(k-31)=D(n) |
| CLUSTER #k+1 | SECTOR #1 | |
| | SECTOR #2 | |
| | SECTOR #3 | |
| | SECTOR #4 | |
| | SECTOR #5 | |
| | ⋮ | |
| | SECTOR #32 | |

| CLUSTER #1 | SECTOR #1 | D(1) |
|---|---|---|
| | SECTOR #2 | |
| | SECTOR #3 | |
| | SECTOR #4 | |
| | SECTOR #5 | |
| | ⋮ | |
| | SECTOR #32 | |
| CLUSTER #2 | SECTOR #1 | D(2) |
| | SECTOR #2 | D(1) |
| | SECTOR #3 | |
| | SECTOR #4 | |
| | SECTOR #5 | |
| | ⋮ | |
| | SECTOR #32 | |
| ⋮ | ⋮ | |
| CLUSTER #k | SECTOR #1 | D(n+31) |
| | SECTOR #2 | D(n+30) |
| | SECTOR #3 | D(n+29) |
| | SECTOR #4 | D(n+28) |
| | SECTOR #5 | D(n+27) |
| | ⋮ | |
| | SECTOR #32 | D(n) |
| CLUSTER #k+1 | SECTOR #1 | D(n+32) |
| | SECTOR #2 | D(n+31) |
| | SECTOR #3 | D(n+30) |
| | SECTOR #4 | D(n+29) |
| | SECTOR #5 | D(n+28) |
| | ⋮ | |
| | SECTOR #32 | D(n+1) |

| CLUSTER #1 | SECTOR #1 | D(1) |
| --- | --- | --- |
| | SECTOR #2 | S(1) |
| | SECTOR #3 | |
| | SECTOR #4 | |
| | SECTOR #5 | |
| | ⋮ | |
| | SECTOR #32 | |
| CLUSTER #2 | SECTOR #1 | D(2) |
| | SECTOR #2 | D(1) |
| | SECTOR #3 | S(2) |
| | SECTOR #4 | |
| | SECTOR #5 | |
| | ⋮ | |
| | SECTOR #32 | |
| CLUSTER #3 | SECTOR #1 | D(3) |
| | SECTOR #2 | D(2) |
| | SECTOR #3 | D(1) |
| | SECTOR #4 | S(3) |
| | SECTOR #5 | |
| | ⋮ | |
| | SECTOR #32 | |
| CLUSTER #4 | SECTOR #1 | D(4) |
| | SECTOR #2 | D(3) |
| | SECTOR #3 | D(2) |
| | SECTOR #4 | D(1) |
| | SECTOR #5 | S(4) |
| | ⋮ | |
| | SECTOR #32 | |
| CLUSTER #5 | SECTOR #1 | |
| | SECTOR #2 | |
| | SECTOR #3 | |
| | SECTOR #4 | |
| | SECTOR #5 | |
| | ⋮ | |
| | SECTOR #32 | |

| CLUSTER #1 | SECTOR #1 | S(1) |
| | SECTOR #2 | D(1) |
| | SECTOR #3 | |
| | SECTOR #4 | |
| | SECTOR #5 | |
| | ⋮ | |
| | SECTOR #32 | |
| CLUSTER #2 | SECTOR #1 | S(2) |
| | SECTOR #2 | D(2) |
| | SECTOR #3 | D(1) |
| | SECTOR #4 | |
| | SECTOR #5 | |
| | ⋮ | |
| | SECTOR #32 | |
| CLUSTER #3 | SECTOR #1 | S(3) |
| | SECTOR #2 | D(3) |
| | SECTOR #3 | D(2) |
| | SECTOR #4 | D(1) |
| | SECTOR #5 | |
| | ⋮ | |
| | SECTOR #32 | |
| CLUSTER #4 | SECTOR #1 | S(4) |
| | SECTOR #2 | D(4) |
| | SECTOR #3 | D(3) |
| | SECTOR #4 | D(2) |
| | SECTOR #5 | D(1) |
| | ⋮ | |
| | SECTOR #32 | |
| CLUSTER #5 | SECTOR #1 | |
| | SECTOR #2 | |
| | SECTOR #3 | |
| | SECTOR #4 | |
| | SECTOR #5 | |
| | ⋮ | |
| | SECTOR #32 | |
| ⋮ | | |

Fig.18

| CLUSTER #1 | SECTOR #1 | S(1) |
| --- | --- | --- |
| | SECTOR #2 | D(1) |
| | SECTOR #3 | |
| | SECTOR #4 | |
| | SECTOR #5 | |
| | ⋮ | |
| | SECTOR #32 | |
| CLUSTER #2 | SECTOR #1 | S(2) |
| | SECTOR #2 | D(2) |
| | SECTOR #3 | D(1) |
| | SECTOR #4 | |
| | SECTOR #5 | |
| | ⋮ | |
| | SECTOR #32 | |
| CLUSTER #3 | SECTOR #1 | S(3) |
| | SECTOR #2 | D(2) |
| | SECTOR #3 | D(1) |
| | SECTOR #4 | |
| | SECTOR #5 | |
| | ⋮ | |
| | SECTOR #32 | |
| CLUSTER #4 | SECTOR #1 | S(4) |
| | SECTOR #2 | D(2) |
| | SECTOR #3 | D(1) |
| | SECTOR #4 | |
| | SECTOR #5 | |
| | ⋮ | |
| | SECTOR #32 | |
| CLUSTER #5 | SECTOR #1 | |
| | SECTOR #2 | |
| | SECTOR #3 | |
| | SECTOR #4 | |
| | SECTOR #5 | |
| | ⋮ | |
| | SECTOR #32 | |

⋮

OPTICAL DISC, OPTICAL DISC RECORDING DEVICE, OPTICAL DISC RECORDING METHOD

TECHNICAL FIELD

The present invention relates to an optical disc having a drive information area for recording a plurality of recording/playback conditions and other drive information, and to a recording apparatus and a recording method for recording to this optical disc.

BACKGROUND TECHNOLOGY

As optical discs have increased in recording density and capacity, assuring optical disc reliability has become increasingly important. To assure this reliability, optical disc drives use a learning process to determine the recording and playback conditions of the disc. This learning process is taught, for example, in Japanese Unexamined Patent Appl. Pub. 2001-338422.

These recording and playback conditions depend greatly upon the characteristics of the optical disc and the characteristics of the optical disc drive. As a result, the learning process used to determine the recording/playback conditions must be executed every time the optical disc drive is started after an optical disc is loaded, and whenever there is a change in either optical disc or optical disc drive characteristics due to such factors as a change in temperature.

Even more recently, further advances in optical disc recording density and storage capacity have made it necessary to determine the recording/playback conditions even more precisely. However, determining the recording/playback conditions more precisely by means of this learning process means that the learning process takes more time. As a result, the optical disc drive spends more time waiting for recording or playback to start.

SUMMARY OF THE INVENTION

The present invention is directed to resolving the foregoing problems, and an object of this invention is to provide an optical disc whereby the time required for the learning process to determine the recording/playback conditions can be shortened.

To achieve this object, an optical disc according to the present invention has a data recording area for recording data and a drive information area for recording drive information. The drive information area stores a plurality of recording/playback conditions, and the plurality of recording/playback conditions are arranged chronologically according to when the conditions are recorded to the disc.

A further optical disc according to the present invention has a plurality of recording layers with each recording layer read by a read beam incident thereto from the same side of the disc. A drive information area for recording drive information is provided on at least one of the plurality of layers, and an unrecorded blank area is provided in the other recording layers at the same radial position as the drive information area.

A plurality of recording/playback conditions are thus recorded chronologically in the order in which the recording/playback conditions are recorded to an optical disc according to the present invention. The drive information is therefore assured of always containing the most recent recording/playback conditions.

Furthermore, the radial position where the drive information area is rendered in one recording layer is left unrecorded and blank in the other recording layers of a multilayer optical disc according to the present invention, thereby assuring that the drive information can be read stably.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 shows the data layout in the drive information area;
FIG. 7 shows the data layout in the drive information area;
FIG. 8 shows the data layout in the drive information area;
FIG. 9 shows the data layout in the drive information area;
FIG. 10 shows the data layout in the drive information area;
FIG. 16 shows the data layout in the drive information area;
FIG. 17 shows the data layout in the drive information area;
and
FIG. 18 shows the data layout in the drive information area.

DESCRIPTION OF THE PREFERRED EMBODIMENTS

A data recording medium according to the present invention has a drive information area for recording drive-specific information such as recording and playback conditions. A data recording and playback apparatus acquires the recording/playback conditions through a learning process, and records the recording/playback conditions to the drive information area of the data recording medium. The recording/playback conditions recorded to the drive information area of the data recording medium are read and used to acquire new recording/playback conditions the next time the learning process is executed.

These recording/playback conditions are the operating conditions used by the optical disc drive when the optical disc drive records information to an optical disc or reproduces recorded information from the optical disc.

The recording/playback conditions also include at least one of the following: pulse conditions relating to the laser pulse emitted to the optical disc, servo conditions controlling servo operation during recording and playback, and playback signal processing conditions for processing the playback signal.

The pulse conditions include, for example, the power of the laser pulse emitted to the optical disc during recording, or the laser pulse conditions for forming marks (the smallest unit of information) on the optical disc. When marks are formed on the optical disc by emitting a plurality of pulses to the optical disc from the leading edge to the trailing edge of the mark, the pulse conditions include at least the output timing and length of the first pulse, and the pulse power of the laser beam in this first pulse, which corresponds to the leading end of the mark, or the output timing and length of the last pulse, and the power of the laser beam in the last pulse, which corresponds to the trailing end of the mark.

The recording/playback conditions could alternatively be the settings of various circuits contained in the data recording and playback apparatus, or codes denoting those settings.

Thus, reusing the recording/playback conditions recorded in the drive information area of the data recording medium simplifies the learning process. As a result, less time is needed to complete the learning process, and the data recording and playback apparatus thus spends less time waiting before recording or playback can begin.

Preferred embodiments of the present invention are described in detail next below with reference to the accompanying figures.

Embodiment 1

Figure 1:
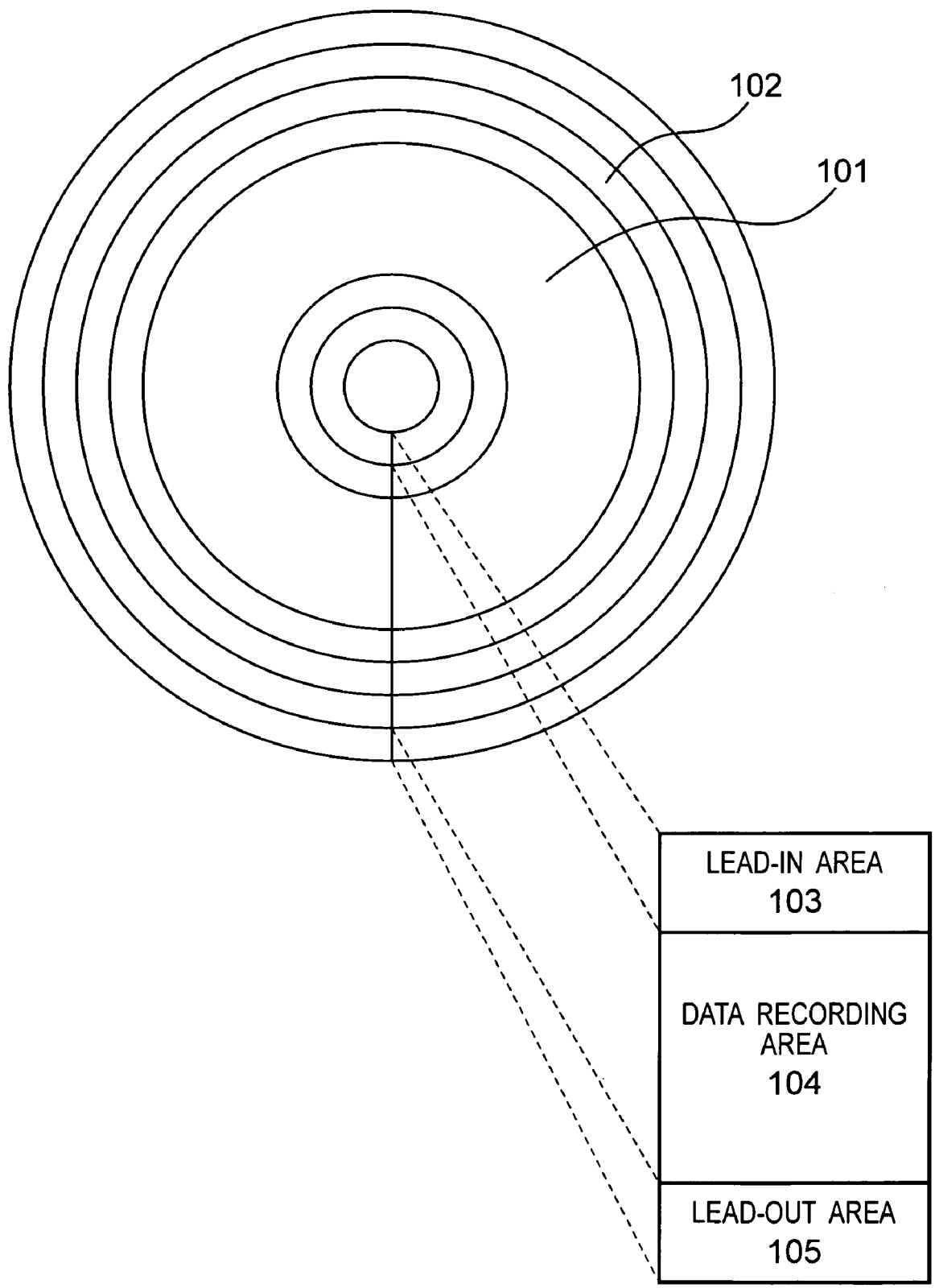
FIG. 1 shows the layout of an optical disc 101 according to a first embodiment of the present invention.

FIG. 1 shows the arrangement of a data recording medium 101 according to a first embodiment of the present invention.

This data recording medium 101 is an optical disc having a plurality of concentric tracks 102. Alternatively, a single spiral track 102 or a plurality of spiral tracks 102 could be formed to the optical disc 101.

The track area of the optical disc 101 includes a lead-in area 103, data recording area 104, and lead-out area 105.

Parameters required to access the optical disc 101 are recorded in the lead-in area 103. The lead-in area 103 is formed at the inside circumference portion of the optical disc 101.

The lead-out area 105 could also be used to record parameters required to access the optical disc 101. The lead-out area 105 is located at the outside circumference portion of the optical disc 101.

Data is recorded and reproduced in the data recording area 104.

Figure 2:
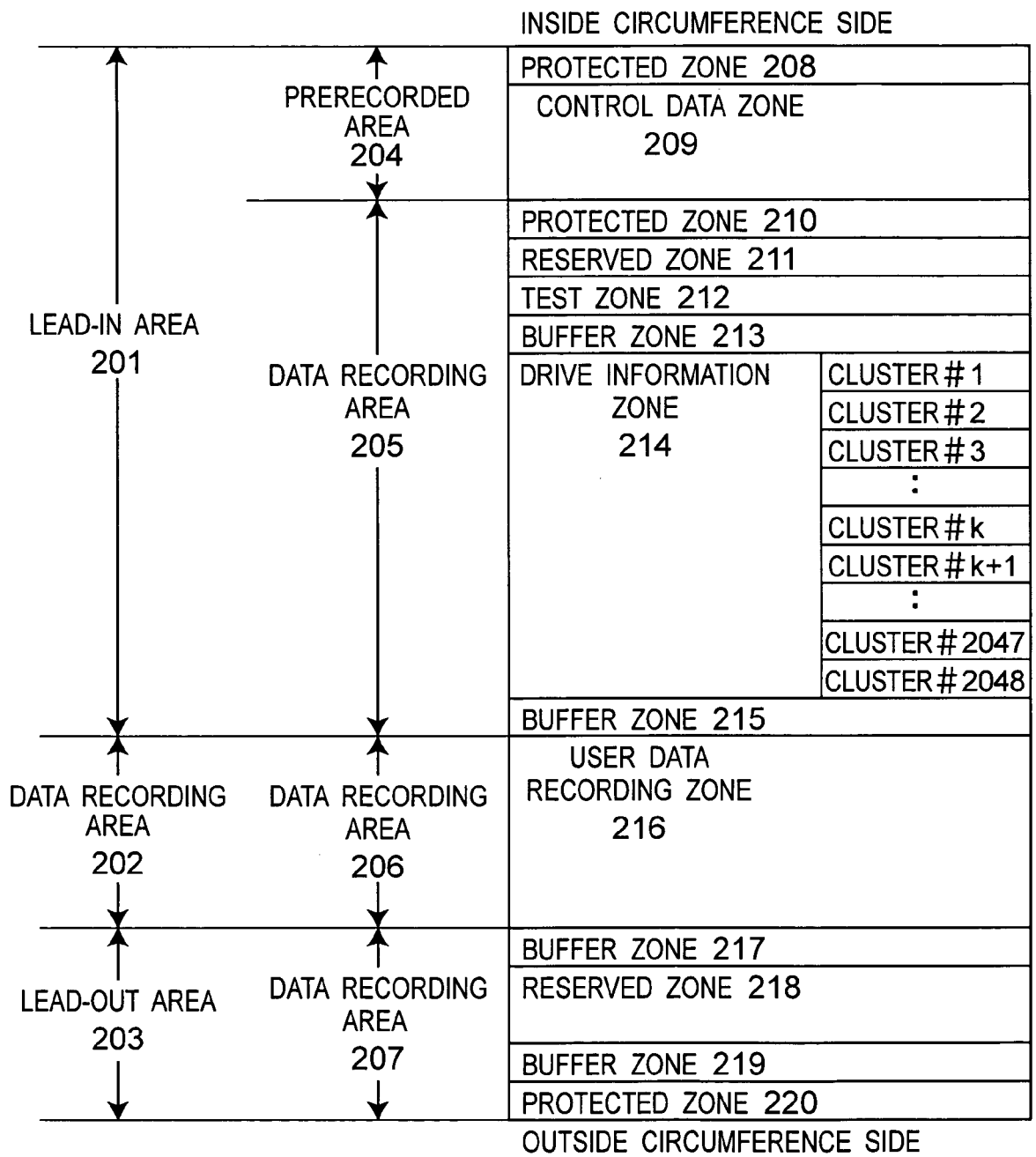
FIG. 2 shows the logic structure of areas in the optical disc shown in FIG. 1.

FIG. 2 shows the logic structure of the lead-in area 103, data recording area 104, and lead-out area 105 on the optical disc 101 shown in FIG. 1.

The lead-in area 201 includes a prerecorded area 204 and a recordable data recording area 205 for recording data. The prerecorded area 204 stores optical disc 101 identification data, for example, recorded in a wobble track, embossed pits, or wobbled embossed pits.

The prerecorded area 204 includes a protected zone 208 as a buffer, and a control data zone 209. The control data zone 209 stores at least one of the following as optical disc 101 identification information: disc type, disc capacity, disc structure, channel bit, data zone address information, data rate, maximum playback power, recording power information, recording pulse position information, and disc-specific information.

The data recording area 205 includes a protected zone 210, a reserved zone 211 enabling future development, a test zone 212 used for testing the optical disc 101, a buffer zone 213, a drive information zone 214 used for storing information such as the optical disc 101 characteristics, and a buffer zone 215. If the track pitch differs in the prerecorded area 204 and data recording area 205, the protected zone 210 can be used as a track pitch transition area.

The data recording area 202 includes a data recording area 206 for recording user data, for example. The data recording area 206 includes a user data recording zone 216.

The lead-out area 203 includes a recordable data recording area 207 for recording data. The data recording area 207 includes a buffer zone 217, a reserved zone 218 enabling future development, a buffer zone 219, and a protected zone 220 where data is not recorded.

The drive information zone 214 is segmented into 2048 ECC blocks (clusters), for example. The ECC blocks are used for calculating an error correction code. The error correction code is calculated for each ECC block. Each ECC block is segmented into 32 sectors, for example.

Figure 3:
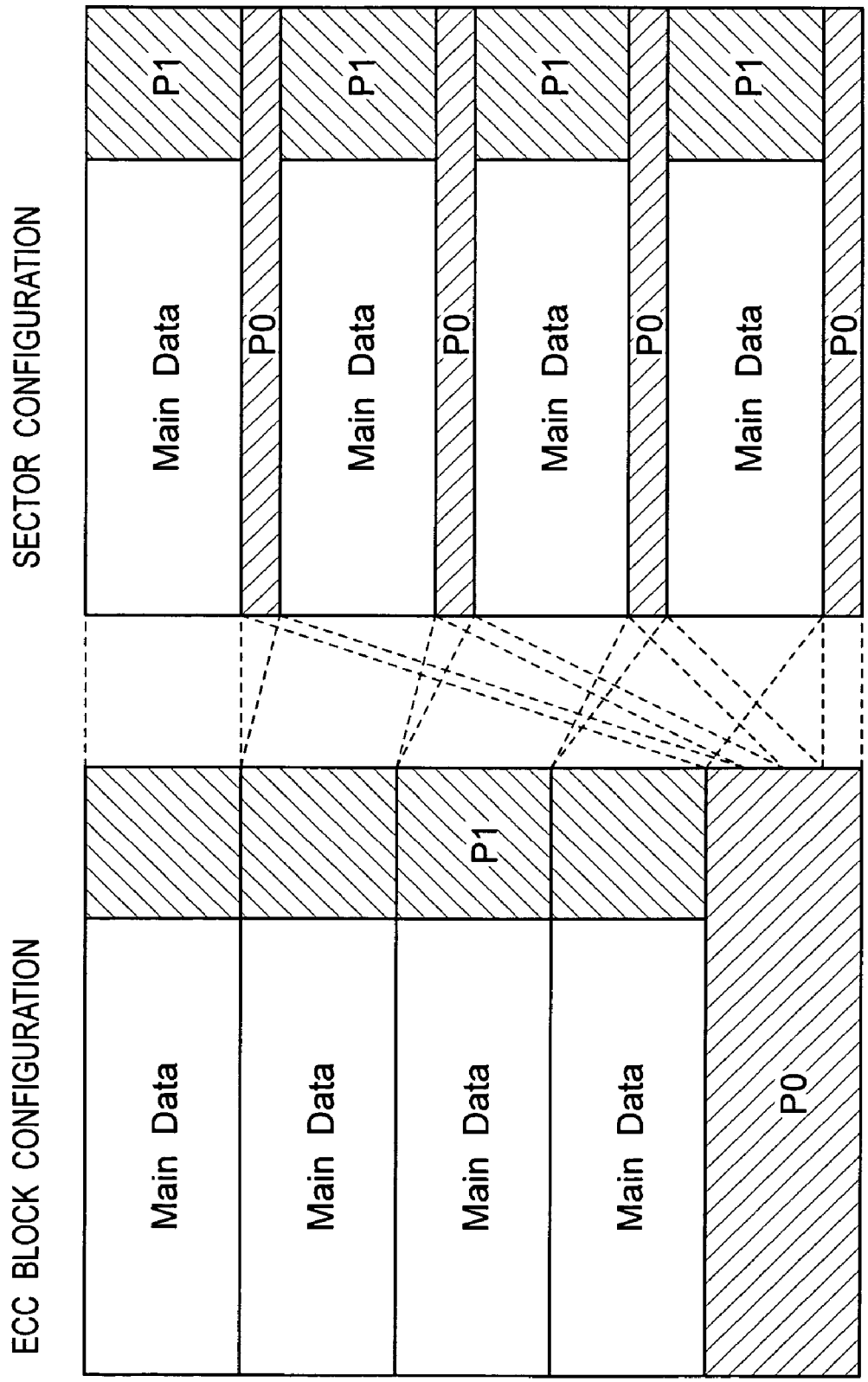
FIG. 3 shows an example of an ECC block.

FIG. 3 shows an example of the ECC block structure. To achieve a high error correction capability and low redundancy in a high capacity optical disc, each ECC block is divided into 32 sectors. For simplicity, however, one ECC block is divided into only 4 sectors in the example shown in FIG. 3.

As shown in FIG. 3, each ECC block includes 172 bytes× 48 rows of Main Data, Parity of Inner Code PI acquired by calculating the error correction code for each row of Main Data, and Parity of Outer Code PO acquired by calculating the error correction code for each vertical column of Main Data.

Error correction codes including inner code parity and outer code parity are generally called product codes. A product code affords strong error correction of both random errors and burst errors (errors that are concentrated locally), such as where there is both random error and a burst error across two rows due to a scratch. Most such burst errors are 2-byte outer code errors and can be corrected. In a column where there are many random errors, however, correction using the outer code is not possible and errors remain, but these remaining errors can usually be corrected using the inner code. Even if inner code correction leaves some errors, these errors can be further reduced by applying outer code correction again. Redundant parity is suppressed and good error correction is assured by using this type of product code in DVD media. More specifically, user data capacity can be increased according to the decrease in redundant parity data.

As shown in FIG. 3, the Parity of Outer Code PO for the ECC block is evenly distributed one row per sector. As a result, one sector thus comprises 182 bytes×13 rows of data.

When the optical disc drive is instructed to record or play an optical disc 101 loaded in the optical disc drive by sector unit, the optical disc drive reads the ECC block containing the specified sector from the optical disc 101, applies error correction, and records only the data corresponding to the specified sector to the optical disc 101.

When the optical disc drive is instructed to record an optical disc 101 loaded in the optical disc drive by sector unit, the optical disc drive reads the ECC block containing the specified sector from the optical disc 101, applies error correction, replaces the data from the specified sector with the data to be recorded, recalculates the ECC and adds the new ECC to the data to be recorded, and then records the ECC block containing the specified sector to the optical disc 101.

A "cluster" as used below means an ECC block as described above.

Figure 4:
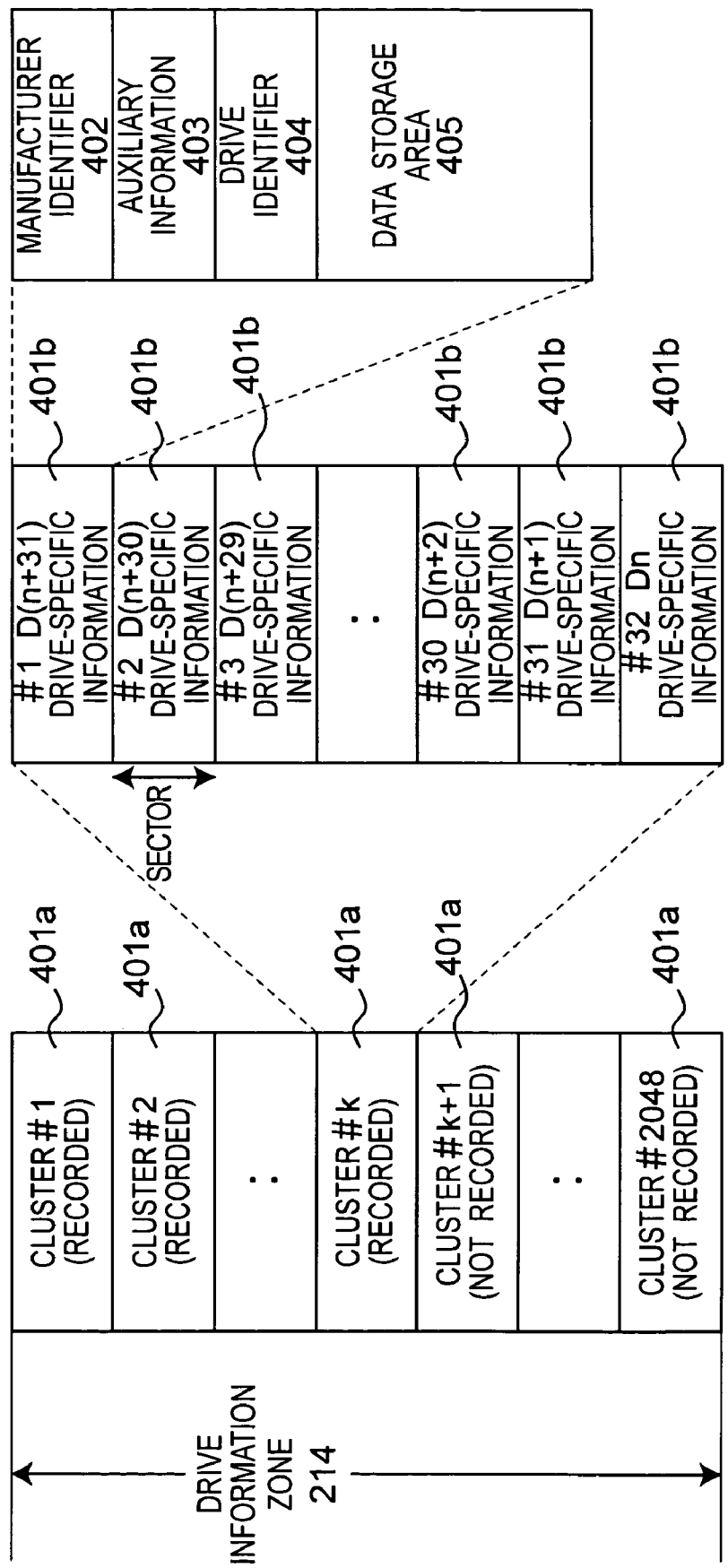
FIG. 4 shows the structure of the drive information area.

FIG. 4 shows the structure of the drive information zone 214 shown in FIG. 2.

The drive information zone 214 contains a plurality of clusters 401a, such as 2048 clusters 401a. These clusters 401a are numbered sequentially from cluster #1 at the inside circumference side to cluster #2, . . . cluster #2048 at the outside circumference side of the drive information zone 214.

Each cluster includes a plurality of sectors 401b, such as 32 sectors 401b. These sectors 401b are also arranged sequentially from sectors #1 at the inside circumference side to sectors #2, . . . sectors #32 at the outside circumference side. The capacity of each sector is sufficient to record one drive-specific information record.

The drive-specific information recorded to each of these sectors defines the operating conditions of the optical disc drive required to record or play data on a loaded optical disc 101. The drive-specific information includes a manufacturer identifier 402, auxiliary information 403, a drive identifier 404, and a data storage area 405. The manufacturer identifier 402 identifies the manufacturer of the optical disc drive. The drive identifier 404 is a serial number, for example, used by the manufacturer to identify that optical disc drive. The data storage area 405 records information such as the recording/playback conditions, such as the required laser power level. Because the recording/playback conditions are stored to the data storage area 405, the drive-specific information is also referred to herein as the recording/playback conditions. It will be obvious that the information stored to the data storage area 405 could be information other than the recording/playback conditions.

Each time a disc is loaded to a different optical disc drive, drive-specific information is generated and recorded to the disc. When a disc is reloaded in an optical disc drive to which it was previously loaded, the drive-specific information for that optical disc drive is read and used as the drive information for using the disc.

Whether a disc was previously loaded in a particular optical disc drive is determined by reading the drive identifier 404. Furthermore, even if the optical disc drive determines that the disc was previously used in that drive, if the recording/playback conditions stored on the disc differ from the current conditions, the drive-specific information can be generated again. As a result, drive-specific information for the same optical disc drive could be recorded more than once to the same optical disc.

The first drive-specific information generated for a particular disc is denoted D(1), the second record of drive-specific information is denoted D(2), and the n-th drive-specific information record is denoted D(n).

The steps for recording a new drive-specific information record to disc are described next below with reference to FIG. 5, FIG. 6, FIG. 7, and FIG. 8.

Figure 5:
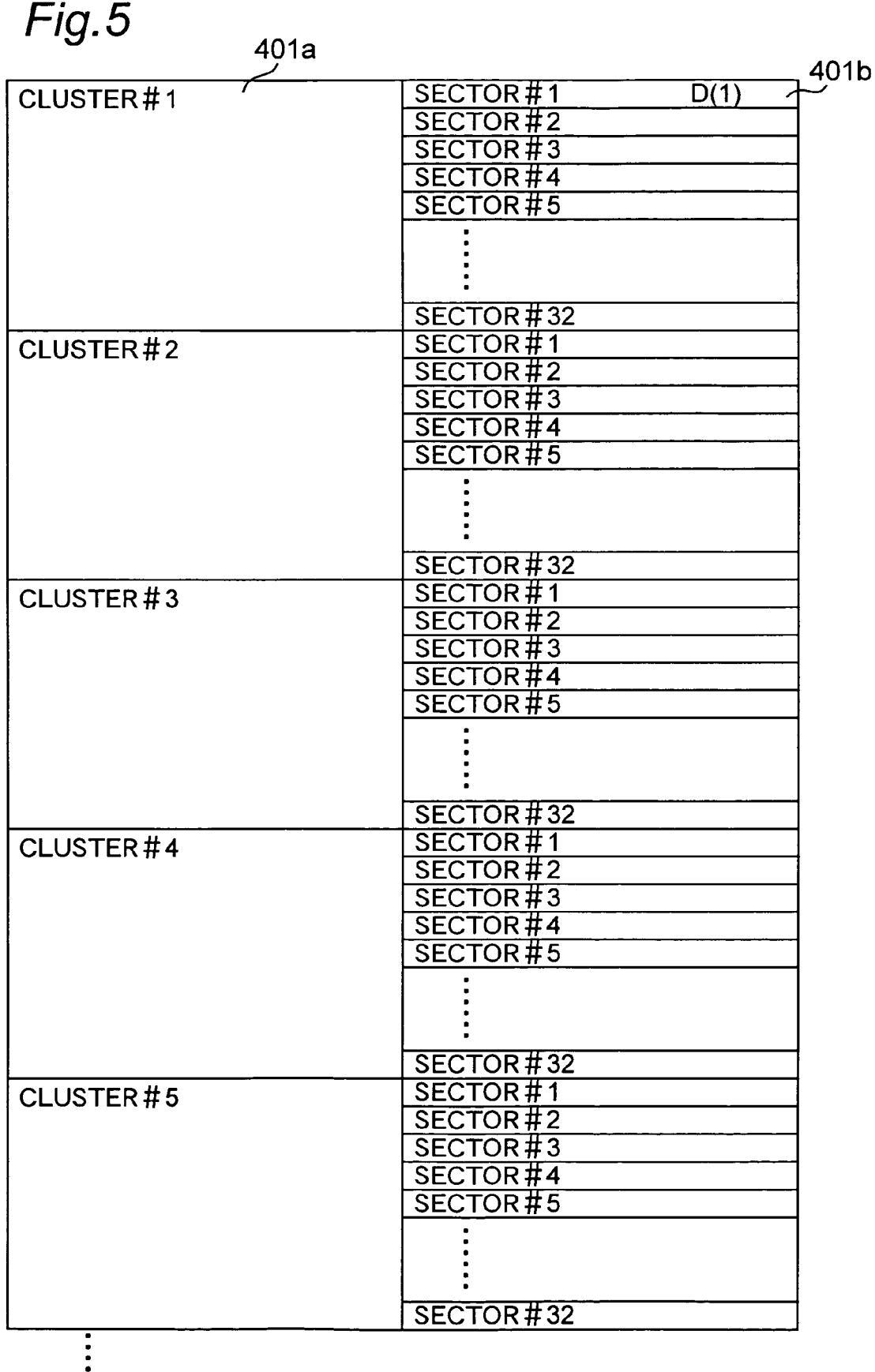
FIG. 5 shows the data layout in the drive information area.

As shown in FIG. 5, when a new disc is loaded to optical disc drive A, drive-specific information is generated for the first time, and drive-specific information D(1) is written to sector #1 of cluster #1.

When the same disc is then loaded in a second optical disc drive B, a second drive-specific information entry D(2) is generated and written to sector #1 of cluster #2 as shown in FIG. 6. The first drive-specific information D(1) recorded in cluster #1 is also copied to sector #2 of cluster #2. The previously used cluster #1 is left unused.

When the same disc is then loaded in a third optical disc drive C, drive-specific information D(3) for the third drive is generated, and record D(3) is recorded to sector #1, cluster #3. The previous entries D(2) and D(1) previously recorded to cluster #2 are also copied in the same sequence to sector #2 and sector #3 of cluster #3. The previously used clusters #1 and #2 are abandoned.

When the same disc is then loaded in a fourth optical disc drive D, drive-specific information D(4) for the fourth drive is generated, and entry D(4) is recorded to sector #1, cluster #4. The previous entries D(3), D(2) and D(1) previously recorded to cluster #3 are also copied in the same sequence to sectors #2, #3, and #4 of cluster #4. The previously used clusters #1, #2, and #3 are abandoned.

As shown in FIG. 9, when the same disc is loaded in a k-th (where k is a positive integer) optical disc drive K, the k-th drive-specific information D(k) is generated and written to sector #1 of the k-th cluster #k. If k≦32, all previous entries D(k−1) . . . D(2), D(1) written to the last-recorded cluster #(k−1) are also copied in the same sequence to sectors #2, #3, . . . #k of k-th cluster #k. If k>32 (the situation shown in FIG. 9), the drive-specific information entries to the last-recorded entry, that is, D(n+30), D(n+29), . . . D(n+1), D(n) (where n=k−31) recorded to the last-recorded cluster #(k−1) are copied in the same sequence to the remaining sectors #2, #3, . . . #k of cluster #k. Entry D(n−1) is not recorded because the sectors are filled when entry D(n) is recorded. The previously used clusters #1, #2, . . . #(k−1) are abandoned.

Note that the k-th drive is not necessary the k-th different drive, and could be a drive to which the disc was previously loaded, such as optical disc drive A when optical disc drive A was not used for a specified period of time (such as six months), or the optical disc drive A settings were changed, or an environmental temperature sensor disposed in the optical disc drive A senses a temperature different from the temperature the last time the disc was loaded, for example.

As shown in FIG. 10, when the same disc is loaded in a (k+1)-th optical disc drive K+1, the (k+1)-th drive-specific information D(k+1) is generated and written to sector #1 of the (k+1)-th cluster #(k+1). The drive-specific information entries to the last-recorded entry, that is, D(n+31), D(n+30), D(n+29), . . . D(n+1) recorded to the last-recorded k-th cluster #(k) are copied in the same sequence to the remaining sectors #2, #3, . . . #k of cluster #(k+1). Entry D(n) is not recorded because the sectors are filled. The previously used clusters #1, #2, #(k) are abandoned.

Up to 32 records of drive-specific information, that is, recording/playback conditions, can thus be recorded in one cluster. The drive-specific information is recorded chronologically from the newest to oldest based on when the entry was written to the optical disc 101. The 32 drive-specific information entries are thus recorded with the entry most recently recorded to the optical disc 101 in the first sector of the cluster and the oldest of the 32 entries recorded in the last sector of cluster #k.

In addition, drive-specific information, that is, recording/playback conditions determined by a new learning process are recorded to the beginning of cluster #k. As a result, drive information area 502 is always assured of containing up to 32 recording/playback conditions entries including the results of the most recent learning process.

The drive information zone 214 contains N ECC blocks (clusters). Each of the N ECC blocks (clusters) contains a plurality of sectors. Each of the plural drive-specific information entries contained in each cluster 401a is recorded to a single corresponding sector. N is any positive integer value or 1 or more, and in this example is 2048.

Figure 11:
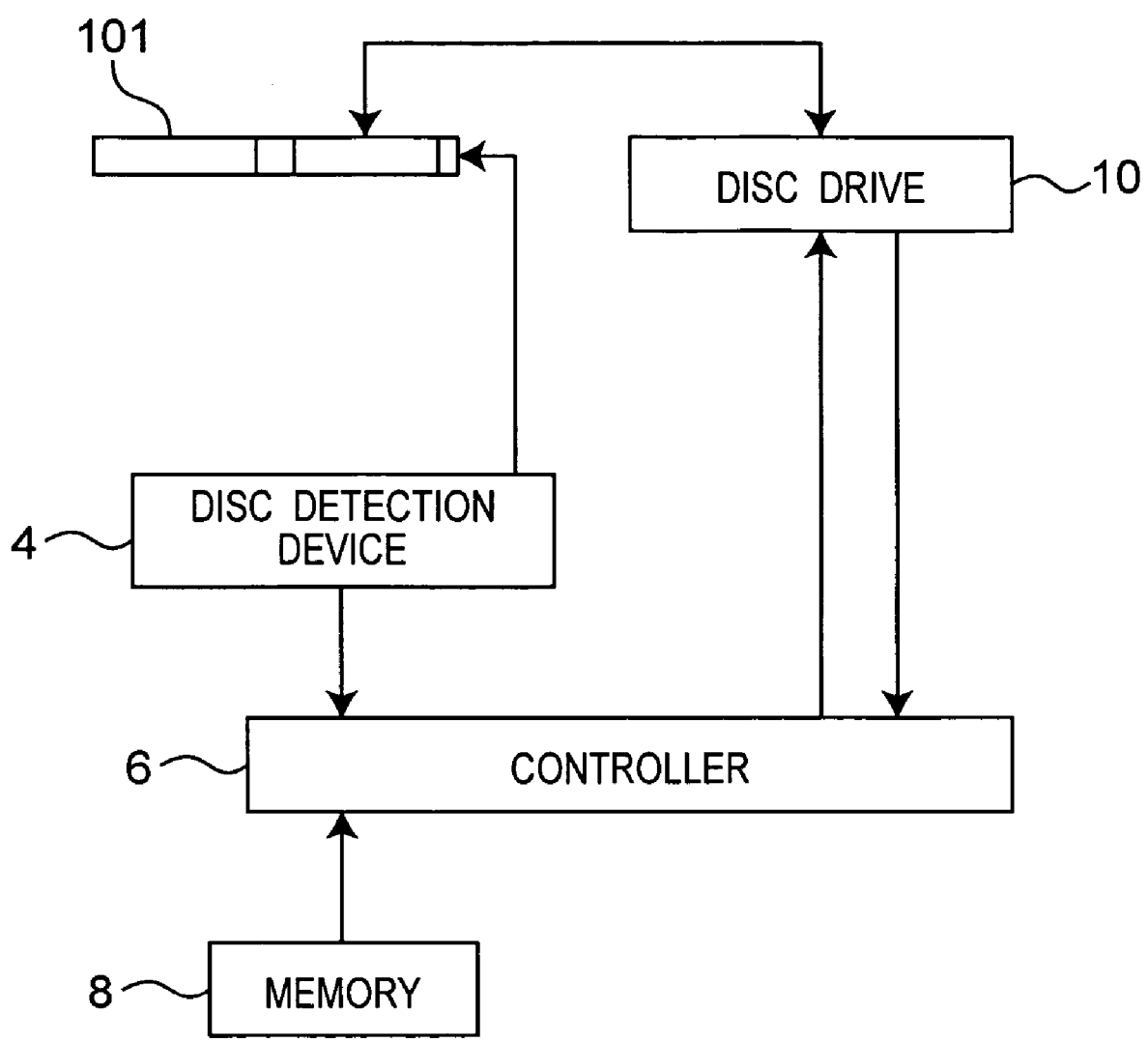
FIG. 11 is a block diagram of an optical disc drive.

FIG. 11 is a block diagram of an optical disc drive. Shown in FIG. 11 are an optical disc 101, a disc detection device 4 for detecting if a disc has been loaded, a controller 6, memory 8, and a disc drive 10 for reading and writing the 101. The memory 8 stores information specific to the optical disc drive, including the manufacturer identifier 402 identifying the manufacturer of the optical disc drive, auxiliary information 403, and a drive identifier 404 such as a serial number used by the manufacturer to identify that optical disc drive.

Figure 12:
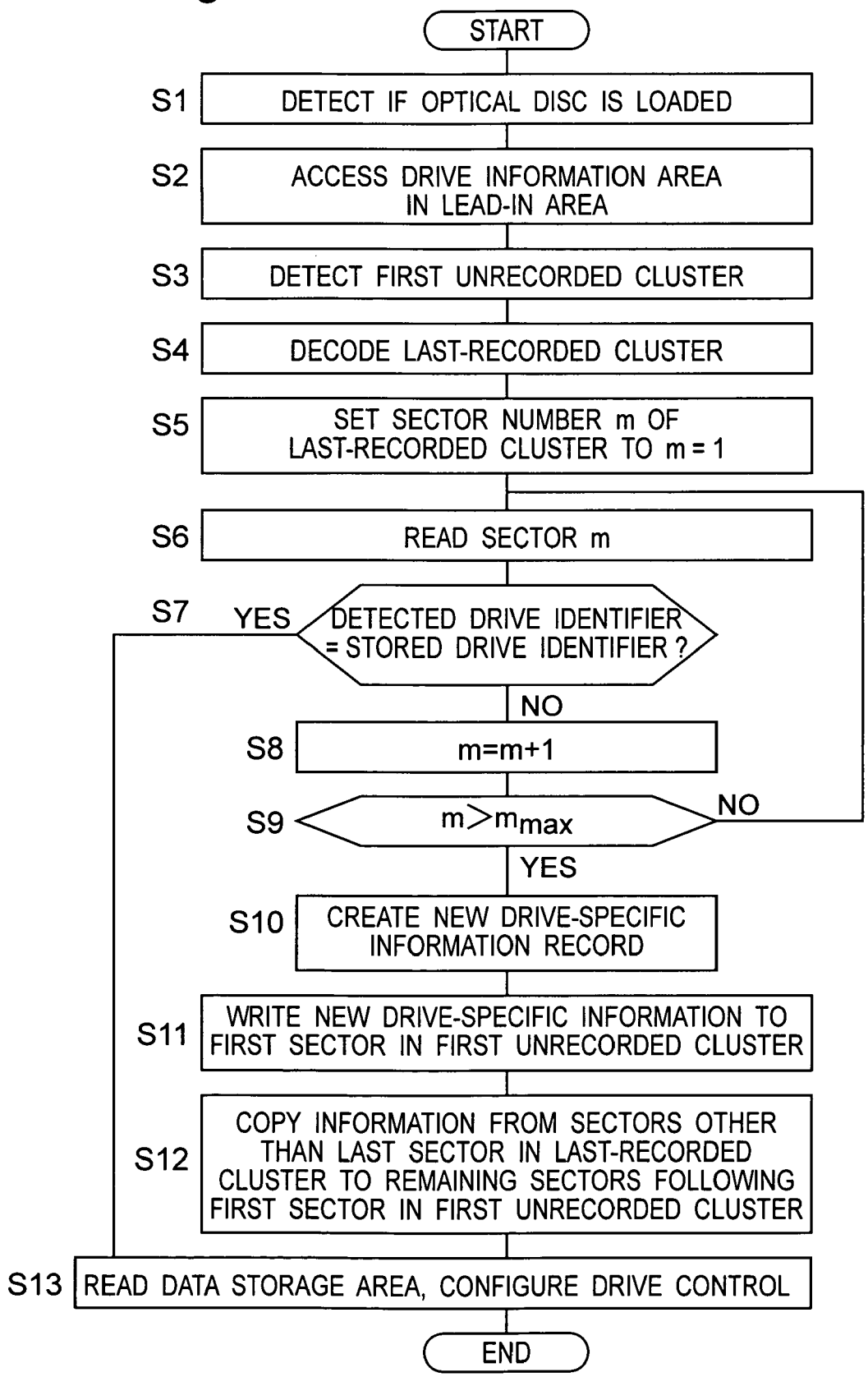
FIG. 12 is a flow chart of the optical disc drive operation.

Operation of this optical disc drive is shown in FIG. 12 and described below.

The disc detection device 4 detects if an optical disc has been loaded (step S1).

The drive information area of the lead-in area on the loaded disc is then accessed (step S2).

Starting from the first cluster, each cluster is inspected to determine if the cluster has been recorded or not in order to detect the first unrecorded cluster (step S3).

The last-recorded cluster, which is the recorded cluster immediately preceding the first unrecorded cluster, is then decoded (step S4).

The sector number m is reset to 1 in order to read the sectors of the decoded last-recorded cluster starting from the first sector (step S5).

Sector m (where m=1 at this time) is then read (step S6).

The drive identifier 404 stored in memory 8 in the optical disc drive is then detected (the detected drive identifier is called the "detected identifier"), the drive identifier recorded in sector m (the "registered identifier") is read, and whether the detected identifier and registered identifier are the same is determined. If the identifiers are the same, controls skips to step S13. If the identifiers are not the same, control goes to step S8.

In step S13, the drive control information recorded in the data storage area 405 of the target sector (sector m of the last-recorded cluster if step S13 is entered from step S7) is read and used to configure the disc drive 10. The disc drive 10 can then proceed with reading/writing the disc based on the read drive control information without first test writing or test reading. As a result, the time between loading the disc and starting to read or write the disc can be shortened.

In step S8, sector number m is incremented one.

Whether sector number m is greater than the maximum sector number $m_{max}$ is then determined (step S9). In this example, maximum sector number $m_{max}$ is 32. If sector number m is less than or equal to $m_{max}$, the procedure loops back to step S6 and steps S7 and S8 repeat. If sector number m is greater than $m_{max}$, control goes to step S10.

In step S10, the disc drive 10 tests writing and reading the optical disc 101 in the test zone 212 to determine the optimum power level for the loaded disc, and thus compiles drive-specific information for the optical disc drive. This drive-specific information is the first drive-specific information acquired from that optical disc drive for that disc, and is thus referred to herein as new drive-specific information.

The new drive-specific information is then written to the first sector (sector #1) of the first unrecorded cluster (step S11).

The information from all sectors other than the last sector (that is, sector #1 to sector #31) in the last-recorded cluster is then copied to the sectors other than the first sector (that is, sector #2 to sector #32) in the first unrecorded cluster (step S12).

In step S13, the drive control information recorded in the data storage area 405 of the target sector (the first sector of the first unrecorded cluster if step S13 is entered from step S12) is used to configure the disc drive 10. The disc drive 10 can then proceed with reading/writing the disc.

Note that when new drive-specific information is produced the disc drive 10 could be configured based on that information before the information is recorded to a sector as described above.

As will be known from the above, when a single disc is loaded into the same optical disc drive, the optical disc drive accesses the drive information zone 214, checks the drive-specific information clusters sequentially from the first cluster to find the first unrecorded cluster, and then starts reading from the first sector in the last-recorded cluster, that is, the cluster before the first unrecorded cluster. As a result, the drive-specific information is read sequentially from the newest to the oldest information. That is, the drive-specific information is arranged so that the last-recorded information is read first.

As will also be known from the above, one cluster is used for one recording of drive-specific information. Cluster #1 is used for the first recording, cluster #2 is used for the second recording, and so forth, proceeding sequentially from the inside circumference side of the disc. Therefore, when drive-specific information has been recorded k times, cluster #1 to cluster #k are recorded, and the newest information is stored in cluster #k.

Updating the drive information area 401 thus assures that the most recently recorded cluster #(k+1) in the drive information area 401 always contains the 32 newest recording/playback conditions 401b, and by reading this cluster first, the learning time can be shortened if the recording/playback conditions that can be used are found.

By thus structuring the drive information area 401 so that the so that data is updated by appending to unrecorded areas of the disc, the method of the present invention is not limited to use with rewritable optical disc media, and can also be used with write-once optical disc media.

Embodiment 2

Figure 13:
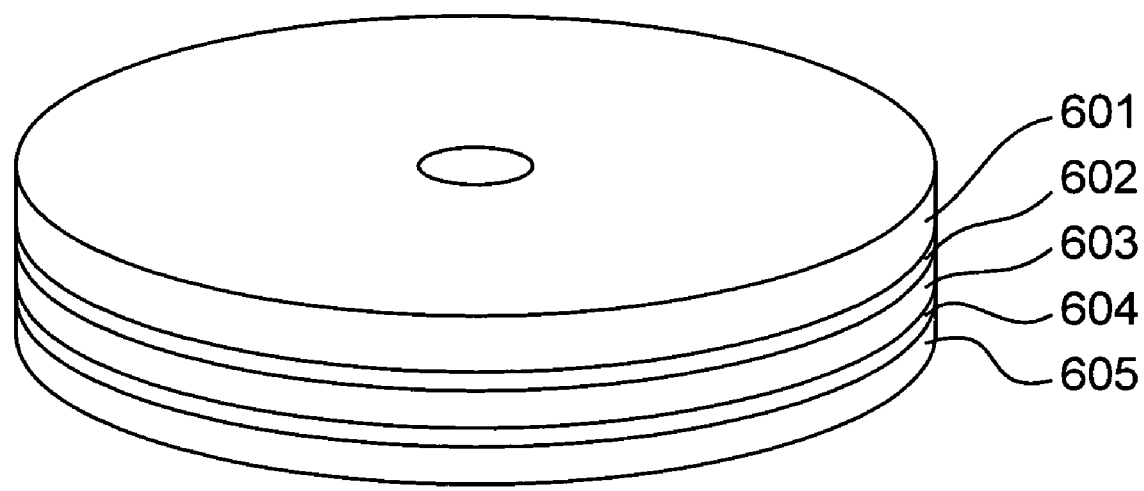
FIG. 13 shows the structure of an optical disc with two recording layers.

FIG. 13 shows the structure of a single-side, two-layer optical disc according to a second embodiment of the present invention.

As shown in FIG. 13 this optical disc has a first substrate 601, first recording layer 602, a space layer 603 of an adhesive resin, for example, a second recording layer 604, and a second substrate 605.

The laser beam is emitted from the second substrate 605 side of the disc shown in FIG. 13 to read and write data to the first recording layer 602 and second recording layer 604.

A single or multiple spiral tracks could be formed on the first recording layer 602 and second recording layer 604.

Figure 14:
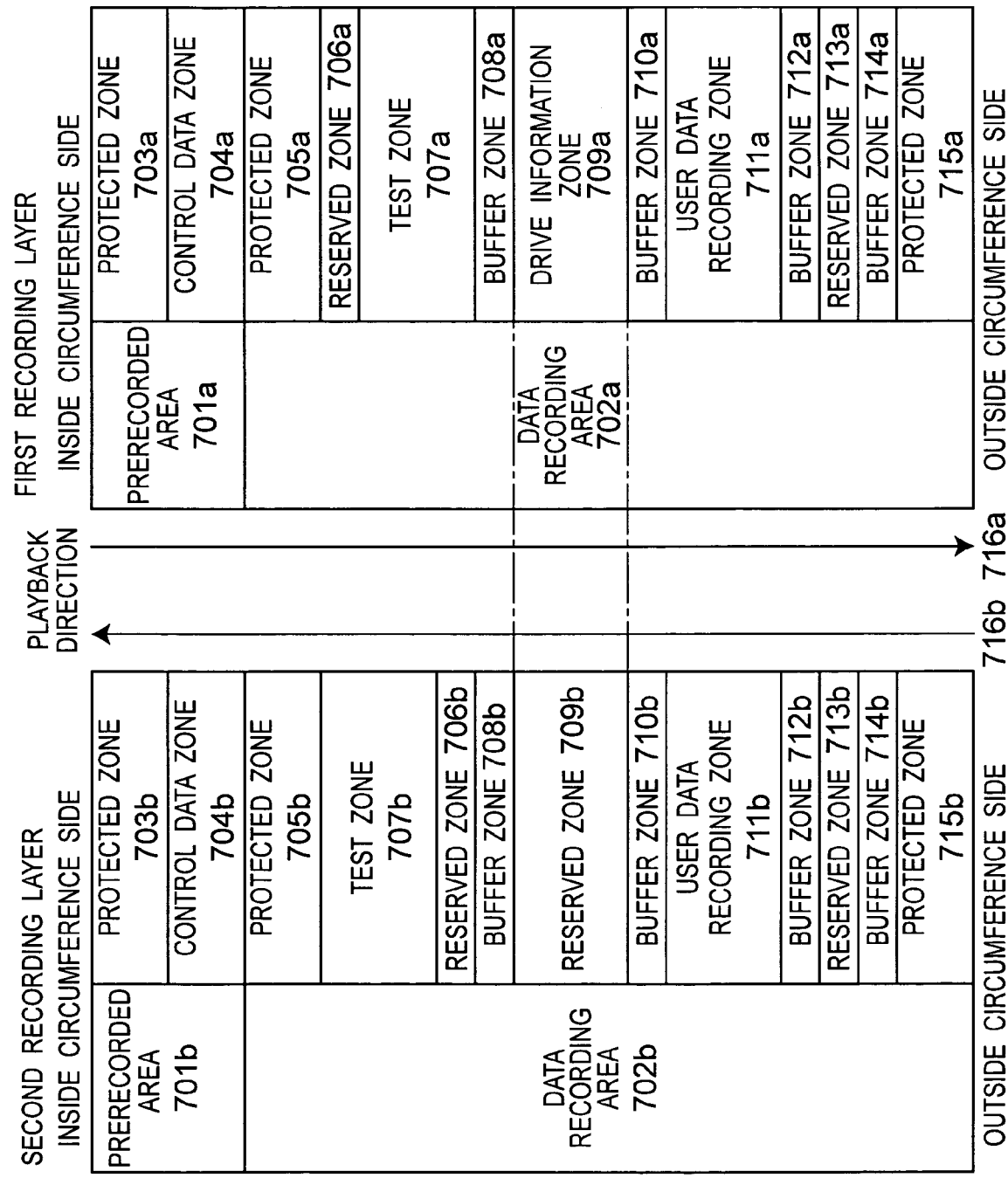
FIG. 14 shows the logic structure of areas in an optical disc according to a second embodiment of the present invention.

FIG. 14 shows the logic structure of a two-layer optical disc according to this embodiment of the invention.

The prerecorded area 701a of the first recording layer stores, for example, identification data for the two-layer optical disc recorded in a wobble track, embossed pits, or wobbled embossed pits.

The prerecorded area 701a includes a protected zone 703a as a buffer, and a control data zone 704a. The control data zone 704a stores at least one of the following as optical disc identification information: disc type, disc capacity, disc structure, channel bit, data zone address information, data rate, maximum playback power, recording power information, recording pulse position information, and disc-specific information.

The information recorded in the control data zone 704a on the first recording layer could be information relating only to the first recording layer, or information relating to the first recording layer and information relating to the second recording layer.

The prerecorded area 701b on the second recording layer is located at the same radial position as the prerecorded area 701a of the first recording layer.

This prerecorded area 701b also includes a protected zone 703b as a buffer, and a control data zone 704b. The control data zone 704b stores at least one of the following as optical disc identification information: disc type, disc capacity, disc structure, channel bit, data zone address information, data rate, maximum playback power, recording power information, recording pulse position information, and disc-specific information.

The information recorded in the control data zone 704b on the second recording layer could be information relating only to the first recording layer, or information relating to the first recording layer and information relating to the second recording layer. The control data zones 704a and 704b could store the same information.

The data recording area 702a on the first recording layer includes a protected zone 705a in which data is not recorded, a reserved zone 706a enabling future development, a test zone 707a used for testing the optical disc, a buffer zone 708a, a drive information zone 709a used for storing information such as optical disc characteristics, a buffer zone 710a, a user data recording zone 711a for recording user data, a buffer zone 712a, a reserved zone 713a enabling future development, a buffer zone 714a, and a protected zone 715a in which data is not recorded.

If the track pitch differs in the prerecorded area 701a and data recording area 702a, the protected zone 705a can be used as a track pitch transition area.

The data recording area 702b on the second recording layer likewise includes a protected zone 705b in which data is not recorded and which can be used as a track pitch transition area when the track pitch differs in the prerecorded area 701b and data recording area 702b. The protected zone 705b on the second recording layer is located at the same radial position as the protected zone 705a on the first recording layer.

The data recording area 702b on the second recording layer also includes a test zone 707b used for testing the optical disc. This test zone 707b is located at the same radial position as, or at a radial position on the inside circumference side of, the reserved zone 706a on the first recording layer.

The data recording area 702b also includes a reserved zone 706b for future developments. This reserved zone 706b is located at the same radial position as, or at a radial position on the inside circumference side of, the test zone 707a on the first recording layer.

The data recording area 702b on the second recording layer also includes a buffer zone 708b, which is located at the same radial position as the buffer zone 708a on the first recording layer.

The data recording area 702b on the second recording layer also includes a reserved zone 709b to which data is not recorded. This reserved zone 709b is located at the same radial position as the drive information zone 709a of the first recording layer.

The data recording area 702b on the second recording layer also includes a buffer zone 710b, a user data recording zone 711b for recording user data, another buffer zone 712b, another reserved zone 713b enabling future developments, a buffer zone 714b, and a protected zone 715b to which data is not recorded. Each of these zones is located at the same radial position as the corresponding buffer zone 710a, user data recording zone 711a, buffer zone 712a, reserved zone 713a enabling future developments, buffer zone 714a, and protected zone 715a to which data is not recorded in the first recording layer.

When the disc is spun for reading and writing along the tracks on the first and second recording layers, the read/write direction of the tracks on the first recording layer is from inside to outside circumference as indicated by arrow 716a in FIG. 14, and the read/write direction of the tracks on the second recording layer is from outside to inside circumference as indicated by arrow 716b.

Because the control data zones are located at the same radial position in the first and second recording layers with the disc arrangement according to this embodiment of the invention, the control data can be read from either recording layer, and the identification information can thus be acquired more quickly.

Furthermore, because a reserved zone 709b where data is not recorded is located on the second recording layer at the same radial position as the drive information zone 709a on the first recording layer, the drive information zone 709a can be read or written through a second recording layer that is always in the same state (that is, blank in this embodiment). As a result, the drive information can be read and written consistently and stably.

Yet further, because a reserved zone where data is not recorded is disposed at the same radial position as at least part of the test zone with the disc format according to the present invention, disc testing can be conducted under consistently stable conditions through another layer that is always in the same state (that is, blank in this embodiment).

It will be obvious to one with ordinary skill in the related art that the structure of drive information zone 709a in this embodiment of the invention could be structured as shown in any of FIG. 4, FIG. 16, FIG. 17, and FIG. 18.

Embodiment 3

FIG. 13 shows the structure of a single-side, two-layer optical disc according to a third embodiment of the present invention.

Figure 15:
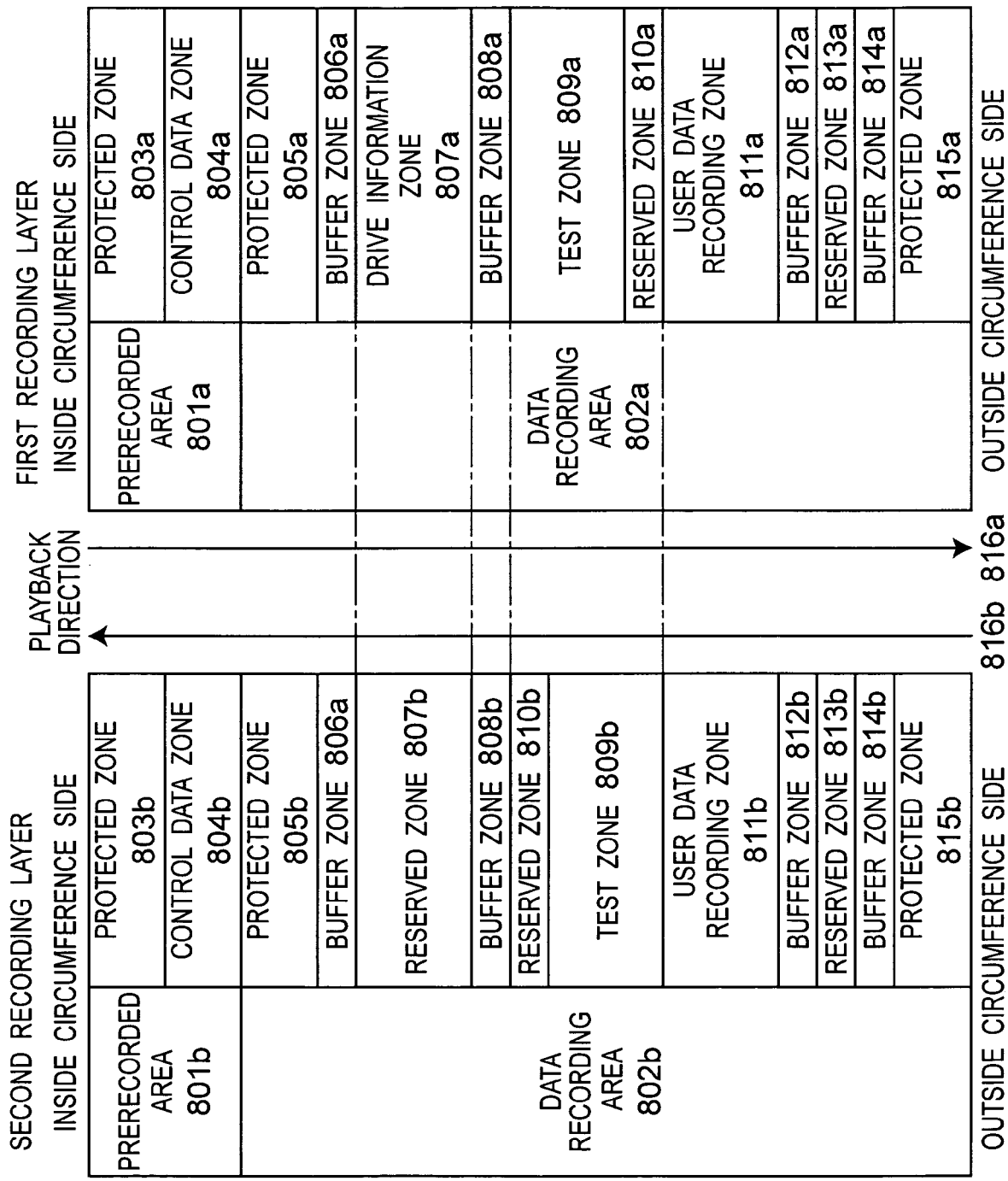
FIG. 15 shows the logic structure of areas in an optical disc according to a third embodiment of the present invention.

FIG. 15 shows the logic structure of a two-layer optical disc according to this embodiment of the invention.

The prerecorded area 801a of the first recording layer stores, for example, identification data for the two-layer optical disc recorded in a wobble track, embossed pits, or wobbled embossed pits.

The prerecorded area 801a includes a protected zone 803a as a buffer, and a control data zone 804a. The control data zone 804a stores at least one of the following as optical disc identification information: disc type, disc capacity, disc structure, channel bit, data zone address information, data rate, maximum playback power, recording power information, recording pulse position information, and disc-specific information.

The information recorded in the control data zone 804a on the first recording layer could be information relating only to the first recording layer, or information relating to the first recording layer and information relating to the second recording layer.

The prerecorded area 801b on the second recording layer is located at the same radial position as the prerecorded area 801a of the first recording layer.

This prerecorded area 801b also includes a protected zone 803b as a buffer, and a control data zone 804b. The control data zone 804b stores at least one of the following as optical disc identification information: disc type, disc capacity, disc structure, channel bit, data zone address information, data rate, maximum playback power, recording power information, recording pulse position information, and disc-specific information.

The information recorded in the control data zone 804b on the second recording layer could be information relating only to the first recording layer, or information relating to the first recording layer and information relating to the second recording layer. The control data zones 804a and 804b could store the same information.

The data recording area 802a on the first recording layer includes a protected zone 805a in which data is not recorded, a buffer zone 806a, a drive information zone 807a used for storing information such as optical disc characteristics, a buffer zone 808a, a test zone 809a used for testing the optical disc, a reserved zone 810a for future developments, a user data recording zone 811a for recording user data, a buffer zone 812a, a reserved zone 813a enabling future development, a buffer zone 814a, and a protected zone 815a in which data is not recorded.

If the track pitch differs in the prerecorded area 801a and data recording area 802a, the protected zone 805a can be used as a track pitch transition area.

The data recording area 802b on the second recording layer likewise includes a protected zone 805b in which data is not recorded and which can be used as a track pitch transition area when the track pitch differs in the prerecorded area 801b and data recording area 802b. The protected zone 805b on the second recording layer is located at the same radial position as the protected zone 805a on the first recording layer.

The data recording area 802b on the second recording layer likewise includes a reserved zone 807b in which data is not recorded. This reserved zone 807b is located at the same radial position as the drive information zone 807a on the first recording layer.

The data recording area 802b of the second recording layer also includes a reserved zone 810b allowing for future developments. This reserved zone 810b is located at the same radial position as, or at a radial position on the inside circumference side of, the test zone 809a on the first recording layer.

The data recording area 802b on the second recording layer also includes a user data recording zone 811b for recording user data, another buffer zone 812b, another reserved zone 813b enabling future developments, a buffer zone 814b, and a protected zone 815b to which data is not recorded. Each of these zones is located at the same radial position as the corresponding user data recording zone 811a, buffer zone 812a, reserved zone 813a enabling future developments, buffer zone 814a, and protected zone 815a to which data is not recorded in the first recording layer.

When the disc is spun for reading and writing along the tracks on the first and second recording layers, the read/write direction of the tracks on the first recording layer is from inside to outside circumference as indicated by arrow 816a in FIG. 15, and the read/write direction of the tracks on the second recording layer is from outside to inside circumference as indicated by arrow 816b.

Because the control data zones are located at the same radial position in the first and second recording layers with the disc arrangement according to this embodiment of the invention, the control data can be read from either recording layer, and the identification information can thus be acquired more quickly.

Furthermore, because a reserved zone 807b where data is not recorded is located on the second recording layer at the same radial position as the drive information zone 807a on the first recording layer, the drive information zone 807a can be read or written through a second recording layer that is always in the same state (that is, blank in this embodiment). As a result, the drive information can be read and written consistently and stably.

Yet further, because a reserved zone where data is not recorded is disposed at the same radial position as at least part of the test zone with the disc format according to the present invention, disc testing can be conducted under consistently stable conditions through another layer that is always in the same state (that is, blank in this embodiment).

It will be obvious to one with ordinary skill in the related art that the structure of drive information zone 807a in this embodiment of the invention could be structured as shown in any of FIG. 4, FIG. 16, FIG. 17, and FIG. 18.

Embodiment 4

FIG. 16 shows the structure of the drive information zone 214 shown in FIG. 2 according to a fourth embodiment of the present invention. FIG. 17 and FIG. 18 show variations of the same.

As shown in FIG. 16, each cluster is segmented into a plurality of sectors (32 sectors in this example) as described in the first embodiment. This fourth embodiment differs from the first embodiment in that in addition to the drive-specific information, disc-specific information S(i) is recorded to one sector.

This disc-specific information S(i) includes, for example, the last address at which user data is recorded, and the last address that was used in the test zone. Drive-specific information D(1) is recorded to sector #1 in cluster #1, and disc-specific information S(1) is recorded to sector #2 in cluster #1. This disc-specific information S(1) contains the last address information following the end of the recorded user data, and the last address information identifying the last address used in the test zone.

When the same disc is loaded in a second optical disc drive, the drive-specific information D(2), D(1) is recorded to sector #1 and sector #2, respectively, in cluster #2, and disc-specific information S(2) is recorded to sector #3, cluster #2. This disc-specific information S(2) records the updated last address information following the address to which the user data was appended, and the updated last address information identifying the last address used in the test zone.

One sector in each cluster is thus used to record disc-specific information. The sector to which the disc-specific information is recorded could be the last used sector in each cluster (as shown in FIG. 16), the first sector in each cluster (as shown in FIG. 17), or some other desirable sector.

The disc-specific information could be updated each time new drive-specific information is added, or each time a specific amount of data is written to the user data recording area. FIG. 18 shows a case in which the disc-specific information is updated each time a specific amount of data is written to the user data recording area.

Referring to FIG. 18, when the disc is loaded in a second optical disc drive, drive-specific information D(2) and D(1) is recorded to sector #2 and sector #3 of cluster #2, and the disc-specific information S(2) is written to sector #1 of cluster #2. This disc-specific information S(2) records the updated last address information following the address to which the user data was appended, and the updated last address information identifying the last address used in the test zone.

If a specified volume F of user data is then recorded to the disc using the same optical disc drive, the same drive-specific information D(2), D(1) is copied from cluster #2 to sector #2 and sector #3 of cluster #3, and the updated disc-specific information S(3) is recorded to sector #1 of cluster #3.

This specified volume F is $$F = 2S/G$$

where G is the number of clusters (G=2048, for example), and S is the capacity of the user data recording area. In this case, the disc-specific information S(i) will be updated G/2 times even if the entire user data recording area is written by the same optical disc drive. Half of the total number of clusters will be left unused in the drive information area, and can be used to record additional access information.

The specified volume F could, of course, be otherwise defined, including:

$F=S/G,$ $F=3S/G,$ $F=4S/G,$ or $F=5S/G.$

Referring to FIG. 17, when the number of drive-specific information records D(n) increases to 31, D(1) to D(31) are written from sector #32 to sector #2 in the chronological order in which the data was generated, and the most recent data D(31) is written to sector #2. The disc-specific information S(i) is recorded in sector #1.

By thus structuring the drive information area 901 so that the so that data is updated by appending to unrecorded areas of the disc, the method of the present invention is not limited to use with rewritable optical disc media, and can also be used with write-once optical disc media.

Furthermore, because both drive-specific information and disc-specific information are recorded in one cluster (ECC block), both the drive-specific information and disc-specific information can be updated by updating only one cluster. The drive-specific information can therefore be used efficiently with particularly noticeable benefit in write-once optical discs that can only be recorded once.

A plurality of recording/playback condition records are recorded to an optical disc according to the present invention chronologically in the order in which the entries are recorded to the disc. As a result, the most recently acquired recording/playback conditions are always contained in the drive information.

Furthermore, in a multilayer disc according to the present invention the area of one layer overlapping the drive information area in another layer is left unrecorded, thereby assuring that the drive information can always be read under stable conditions:

The present invention is based on the previously filed Japanese Patent Applications 2002-192192 and 2002-310094, the content of which is hereby incorporated by reference.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical disc comprising:
a data recording area for recording data; and
a drive information area for recording drive-specific information, wherein:
the drive information area comprises a plurality of clusters,
each cluster comprises a plurality of sectors,
each sector has capacity for storing one record of drive-specific information,
the plural records of drive-specific information are arranged in an order in which the plural records were recorded with a last-recorded record of the plural records of drive-specific information located in a first sector of a current cluster following a last sector of a previous cluster,
new drive-specific information is newly recorded to a first sector in a new cluster,
information from all sectors except a last sector in an immediately preceding cluster is newly recorded to sectors following the first sector in the new cluster which includes the new drive-specific information, the immediately preceding cluster being recorded with all previous records of drive-specific information, and
the new cluster is immediately next to the preceding cluster in the same drive information area in the optical disc.

2. An optical disc as described in claim 1, wherein
the drive-specific information includes a manufacturer identifier for identifying a manufacturer of an optical disc drive.

3. An optical disc as described in claim 2, wherein the drive identifier is a serial number of the optical disc drive.

4. An optical disc as described in claim 1, wherein
the new cluster is immediately next to the preceding cluster in the same drive information area in an outward radial direction of the optical disc.

5. An optical disc as described in claim 1, wherein
the drive-specific information includes a drive identifier of the optical disc drive.

6. An optical disc as described claim 5, wherein the drive identifier is a serial number of the optical disc drive.

7. An optical disc as described in claim 1, wherein
the drive-specific information includes recording/playback conditions including a required laser power level.

8. An optical disc drive for writing on to an optical disc having a data recording area for recording data, and a drive information area for recording drive-specific information, wherein the drive information area comprises a plurality of clusters, each cluster comprises a plurality of sectors, each sector has capacity for storing one record of drive-specific information, and the plural records of drive-specific information are arranged in an order in which the plural records were recorded with a last-recorded record of the plural records of drive-specific information located in a first sector of a current cluster following a last sector of a previous cluster, the optical disc drive comprising:
a writing unit operable to write, at a time of recording new drive-specific information, the new drive-specific information to a first sector in a new cluster, and to write information from all sectors except a last sector in an immediately preceding cluster to remaining sectors following the first sector in the new cluster which includes the new drive-specific information, the immediately preceding cluster being recorded with all previous records of drive-specific information,
wherein the new cluster is immediately next to the preceding cluster in the same drive information area in the optical disc.

9. An optical disc drive as described in claim 8, wherein
the drive-specific information includes a manufacturer identifier for identifying a manufacturer of an optical disc drive, and
the writing unit is operable to write the manufacturer identifier to the drive information area.

10. An optical disc drive as described in claim 8, wherein
the drive-specific information includes a drive identifier of the optical disc drive, and
the writing unit is operable to write the drive identifier to the drive information area.

11. An optical disc drive as described in claim 8, wherein
the drive-specific information includes recording/playback conditions including a required laser power level, and
the writing unit is operable to write the recording/playback conditions including the required laser power level to the drive information area.

12. An optical disc drive as described in claim 8, wherein the optical disc further comprises at least a first recording layer and a second recording layer each read by a read beam incident thereto from a same side of the optical disc,
the drive information area for recording drive-specific information is disposed to the first recording layer, and an area in the second recording layer at a same radial position as the drive information area is unrecorded, and
the writing unit is operable to write the drive-specific information to the first recording layer.

13. An optical disc recording method for recording to an optical disc having a data recording area for recording data, and a drive information area for recording drive-specific information, wherein the drive information area comprises a plurality of clusters, each cluster comprises a plurality of sectors, each sector has capacity for recording one record of drive-specific information, and the plural records of drive-specific information are arranged in an order in which the plural records were recorded with a last-recorded record of drive-specific information located in a first sector of a current cluster following a last sector of a previous cluster, the optical disc recording method comprising:
writing, at a time of recording new drive-specific information, the new drive-specific information to a first sector in a new cluster, and writing information from all sectors except a last sector in an immediately preceding cluster to remaining sectors following the first sector in the new cluster which includes the new drive-specific information, the immediately preceding cluster being recorded with all previous records of drive-specific information,
wherein the new cluster is immediately next to the preceding cluster in the same drive information area in the optical disc.

14. An optical disc drive for reading from an optical disc having a data recording area for recording data, and a drive information area for recording drive-specific information, wherein the drive information area comprises a plurality of cluster, each cluster comprises a plurality of sectors, each sector has capacity for storing one record of drive-specific information, and the plural records of drive-specific information are arranged in an order in which the plural records were recorded with a last-recorded record of the plural records of drive-specific information located in a first sector of a current cluster following a last sector of a previous cluster, and new drive-specific information is newly recorded to a first sector in a new cluster, information from all sectors except a last sector in an immediately preceding cluster is newly recorded to sectors following the first sector in the new cluster which includes the new drive-specific information, the immediately preceding cluster being recorded with all previous records of drive-specific information, the optical disc drive comprising:
a reading unit operable to read the new cluster, at a time of playback recording data,
wherein the new cluster is immediately next to the preceding cluster in the same drive information area of the optical disc.

15. An optical disc drive as described in claim 14, wherein the drive-specific information includes a manufacturer identifier for identifying a manufacturer of an optical disc drive, and
the reading unit is operable to read the manufacturer identifier from the drive information area.

16. An optical disc drive as described in claim 14, wherein the drive-specific information includes a drive identifier of the optical disc drive, and
the reading unit is operable to read the drive identifier from the drive information area.

17. An optical disc drive as described in claim 14, wherein the drive-specific information includes recording/playback conditions including a required laser power level, and
the reading unit is operable to read the recording/playback conditions including a required laser power level from the drive information area.

18. An optical disc drive as described in claim 14, wherein the optical disc further comprises at least a first recording layer and a second recording layer each read by a read beam incident thereto from a same side of the optical disc,
the drive information area for recording drive-specific information is disposed to the first recording layer, and an area in the second recording layer at a same radial position as the drive information area is unrecorded, and
the reading unit is operable to read the drive-specific information from the first recording layer.

* * * * *

UNITED STATES PATENT AND TRADEMARK OFFICE
CERTIFICATE OF CORRECTION

PATENT NO.         : 7,539,111 B2                                         Page 1 of 1
APPLICATION NO.    : 10/519535
DATED              : May 26, 2009
INVENTOR(S)        : Takashi Ishida et al.

It is certified that error appears in the above-identified patent and that said Letters Patent is hereby corrected as shown below:

IN THE CLAIMS

In column 14, line 13, the claim should read as follows:

3. An optical disc as described in claim ~~2, wherein the drive identifier is a serial number of the optical disc drive.~~ 1, further comprising at least a first recording layer and a second recording layer each read by a read beam incident thereto from a same side of the optical disc, wherein the drive information area for recording drive-specific information is disposed to the first recording layer, and an area in the second recording layer at a same radial position as the drive information area is unrecorded.

Signed and Sealed this

Sixteenth Day of March, 2010

David J. Kappos
*Director of the United States Patent and Trademark Office*